United States Patent Office 3,282,948
Patented Nov. 1, 1966

3,282,948
SUBSTITUTED SPIROCYCLOALKANE-1,1'-HEXA-
HYDROINDENOPYRIDINES
Marshall D. Draper, Woodland Hills, Calif., assignor to
Rexall Drug and Chemical Company, Los Angeles,
Calif., a corporation of Delaware
No Drawing. Filed Feb. 12, 1965, Ser. No. 432,375
3 Claims. (Cl. 260—294.7)

This invention relates to compositions of matter classified in the art of chemistry as substituted spiranes.

The invention sought to be patented is described as residing in the concept of a chemical compound having a molecular structure in which the 9-oxo-1,2,3,4,4a,9a,-hexahydro-9H-indeno[2,1c]pyridine nucleus bears at the 2-position a lower alkyl radical and at the 4a-position a phenyl radical and in which the carbon atom constituting the 1-position of the nucleus forms one of the carbon atoms of a cycloalkyl ring having 6 to 8 carbon atoms, and the hereinafter described equivalents thereof.

As used throughout the specification and/or in the claims, the term "lower alkyl" embraces straight and branched chain alkyl radicals containing 1 to 6 carbon atoms, for example methyl, ethyl, isopropyl, sec-butyl, tert-butyl, n-amyl, n-hexyl, 2-ethylbutyl and the like; the term "lower alkoxy" embraces straight and branched chain alkoxy radicals containing 1 to 6 carbon atoms, for example methoxy, ethoxy, isopropoxy, tert-butoxy, n-hexyloxy, 2-ethylbutoxy and the like; the term "halo" embraces fluoro, chloro, bromo and iodo; and the term "cycloalkyl ring having 6 to 8 carbon atoms" embraces a cycloalkyl ring having 6 to 8 carbon atoms in the ring, for example cyclohexyl, cycloheptyl and cyclooctyl.

The tangible embodiments of this invention possess the inherent general physical characteristics of being, in the form of their acid-addition salts, solid crystalline materials. Elemental analysis, as well as infra-red spectral and nuclear magnetic resonance (NMR) data, taken together with the nature of the starting material and mode of synthesis, positively confirm the structure of the compounds sought to be patented.

The tangible embodiments of this invention also possess the inherent applied use characteristics of having significant pharmacological activity as central nervous system depressant agents with no adverse toxicity as determined by recognized and accepted pharmacological test procedures.

The manner and process of making and using the invention will now be generally described so as to enable a person skilled in the art of chemistry to make and use the same as follows:

The starting materials for the preparation of the tangible embodiments of this invention are N-lower alkyl-3-oxo-1-phenyl-1-indanethylamines which are prepared from 3-oxo-1-phenyl-1-indanacetic acid, C. F. Koelsch, J. Org. Chem., 25: 2088–91 (1960), by treatment with thionyl chloride and a lower alkylamine to form an N-lower alkyl-3-oxo-1-phenyl-1-indanacetamide followed by treatment of the amide with lithium aluminum hydride to form the starting materials in admixture with N-lower alkyl-3-hydroxy-1-phenyl-1-indanethylamines as described in my application Serial No. 432,393 entitled "Substituted 3-Oxoindans," filed February 12, 1965, now abandoned. For greater yields, the mixture described above of 3-oxo- and 3-hydroxy-substituted 1-indanethylamines can be converted solely to the desired 3-oxo form by treatment of the mixture with Jones reagent (chromium trioxide in sulfuric acid, as described in the above-identified application.

Conversion of the starting material to the tangible embodiments of this invention is carried out as described in the following reaction sequence:

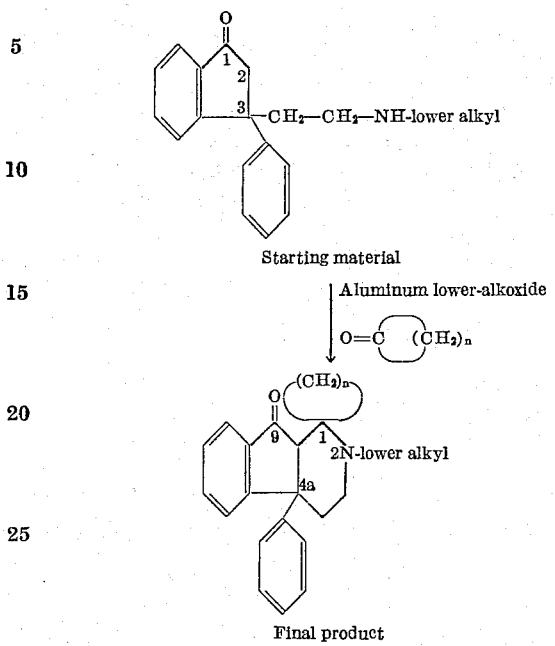

where $n$ is 5 to 7.

In accordance with the above depicted reaction sequence the starting material is converted to the tangible embodiments of the invention by means of the well-known Oppenauer oxidation reaction. In this reaction, which is thoroughly discussed by C. Djerrasi in Organic Reactions, vol. 6, pp. 207–272 (1951), the starting material is heated to reflux temperature in an organic solvent such as, for example, benzene or toluene, and in the presence of an aluminum lower-alkoxide such as, for example, aluminum isopropoxide or aluminum t-butoxide, with the appropriate cyclic ketone, for example, cyclohexanone ($n=5$), cycloheptanone ($n=6$), or cyclooctanone ($n=7$). The product is then recovered by conventional extraction and crystallization techniques.

Starting materials wherein the benzene rings bear one or more lower alkyl, lower alkoxy or halo groups are prepared by the same techniques as are the specific starting materials depicted hereinabove. Their use in the above described reaction sequence results in the preparation of products having alkyl, alkoxy or halo substitution on the benzene rings at the same place as in the starting materials, such products having the same utility as the specific products depicted in the above reaction sequence.

The tangible embodiments of this invention can, if desired be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the proprionate, and especially those with hydroxy organic acids and dibasic acids, such as citrate, tartrate, malate, maleate and fumarate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers to form such dosage forms as tablets, suspensions, solutions, suppositories and the like.

The best mode contemplated by the inventor for carrying out his invention will now be set forth as follows:

EXAMPLE 1

*Spirocyclohexane-1,1'-(2-methyl-9-oxo-4a-phenyl-1,2,3,4,4a,9a-hexahydro-9H-indeno[2,1-c]pyridine)*

A mixture of N-methly-3-oxo-1-phenyl-1-indanethylamine and N - methyl-3-hydroxy-1-phenyl-1-indanethylamine (20 g.) is dissolved in toluene (750 ml.) and cyclohexanone (160 ml.) added. The mixture is refluxed under a take-off trap until all the moisture is removed, then aluminum isopropoxide (78 g.), is added. Refluxing is continued for 3 hours and then poured into a slurry of water (500 ml.), ice (750 g.), concentrated sulfuric acid (25 ml.) and ether (300 ml.). The mixture is passed through a suction filter, shaken and the two phases separated. The filter cake is washed with 2% sulfuric acid (250 ml.) and the organic layer extracted with this wash. The aqueous layers are combined and extracted three times with 200 ml. portions of ether, then made basic with 12 N sodium hydroxide (pH 11) and again extracted three times with 250 ml. portions of ether. These latter ether extracts are washed with water, dried over anhydrous magnesium sulfate and the solvent removed in vacuo to yield 18.0 g. of a gummy material. This is dissolved in petroleum ether and filtered. Cooling yields 7.1 g. of crystals. The hydrochlorite is formed and recrystallized from methanol/ethyl acetate. Yield: 7.7 g., M.P. 168–170° C.

*Analysis.*—Calculated for $C_{24}H_{28}NOCl \cdot CH_3OH$: C, 72.52%; H, 7.79%; N, 3.38%. Found: C, 72.53%; H, 8.14%; N, 3.36%.

EXAMPLE 2

*Spirocycloheptane-1,1'(2-methyl-9-oxo-4a-phenyl-1,2,3,4,4a,9a-hexahydro-9H-indeno[2,1-c]pyridine)*

N - methyl-3-oxo-1-phenyl-1-indanethylamide oxalate (15 g., 0.0415 mole) is converted to the free base with ammonium hydroxide and recovered by extraction with ether.

The base is taken up in toluene (150 ml.) and cycloheptanone (50 ml.) and permitted to remain at room temperature overnight. The mixture is heated for about 1½ hours to remove moisture and then to it is added aluminum isopropoxide (18 g., 0.1 mole) and the mixture set to reflux for 3 hours. The reaction is decomposed by adding a slurry of ice water (600 ml.) and concentrated hydrochloric acid (about 50 ml.). The hydrochloride salt is extracted from the acidified mixture and the crude product obtained in a yield of 8.85 g. (62%). The hydrochloride salt is recrystallized from ether, M.P. 128° C.

*Analysis.*—Calculated for $C_{25}H_{30}NOCl \cdot \frac{1}{2}H_2O$: C, 74.14%; H, 7.71%; N, 3.46%; Cl, 8.75%. Found: C, 73.90%; H, 7.59%; N, 3.69%; Cl, 8.95%.

The foregoing examples have described the preparation of spirocyclohexane- and spirocycloheptane-substituted embodiments of this invention. By carrying out these reactions utilizing cyclooctane as the cyclic ketone, the spirocyclooctane-substituted embodiment is readily obtained. The foregoing description has been limited to the use of unsubstituted cyclic ketones in the above described reaction. Cyclic ketones having 6–8 carbon atoms and bearing one or more lower alkyl substituents, such as methylcyclohexanone, ethylcycloheptanone, 2,3-dimethylcycloheptanone and the like are full equivalents to unsubstituted cyclic ketones in the above-described reaction sequence to yield spiro-derivatives having similar lower alkyl substitution on the spiro-ring with the same utility as the unsubstituted spiro-derivatives.

The subject matter which the applicant regards as his invention is particularly pointed out and distinctly claimed as follows.

I claim:

1. A compound of the formula

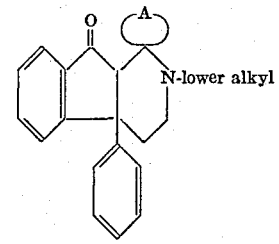

wherein A in conjunction with the carbon atom to which it is joined forms a cycloalkyl ring having 6 to 8 carbon atoms.

2. Spirocyclohexane - 1,1' - (2 - methyl - 9 - oxo - 4a-phenyl - 1,2,3,4,4a,9a - hexahydro-9H-indeno[2,1-c]pyridine).

3. Spirocycloheptane - 1,1' - (2 - methyl - 9 - oxo-4a-phenyl - 1,2,3,4,4a,9a - hexahydro-9H-indeno[2,1-c]pyridine).

No references cited.

WALTER A. MODANCE, *Primary Examiner.*

AVROM D. SPEVACK, *Assistant Examiner.*